United States Patent [19]

Walker et al.

[11] 3,908,451

[45] Sept. 30, 1975

[54] APPARATUS FOR MEASURING ENGINE FUEL EFFICIENCY

[75] Inventors: Monty C. Walker, Glendale; Richard R. Williams, Downey, both of Calif.

[73] Assignee: Quanta Systems, Inc., Van Nuys, Calif.

[22] Filed: Sept. 10, 1973

[21] Appl. No.: 395,826

[52] U.S. Cl. ............................. 73/114; 235/150.21
[51] Int. Cl.² ........................................ G01M 15/00
[58] Field of Search ............. 73/114, 113; 235/61 J, 235/150.21, 92 FL, 92 NT, 92 BD

[56] References Cited
UNITED STATES PATENTS

| | | | |
|---|---|---|---|
| 1,433,310 | 10/1922 | Stuber | 73/114 X |
| 3,537,302 | 11/1970 | Marek et al. | 73/114 |
| 3,549,868 | 12/1970 | Watson et al. | 73/114 X |
| 3,614,617 | 10/1971 | Blake, Jr. | 73/113 UX |

*Primary Examiner*—Jerry W. Myracle
*Attorney, Agent, or Firm*—Lindenberg, Freilich, Wasserman, Rosen & Fennandez

[57] ABSTRACT

Apparatus particularly useful in a motor driven vehicle for calculating and displaying both the current and historical fuel efficiency and/or rates of fuel consumption. The apparatus includes means for measuring the value of a variable quantity, e.g., miles traversed, accumulated during the most recent interval defined by a unit quantity, e.g., 0.01 gallon, consumed, for the purpose of displaying current fuel efficiency. Additionally, the apparatus includes arithmetic means for developing the average of the variable quantity accumulated over many such unit quantity intervals. Thus, when the apparatus is used in an automobile, for example, it is able to display to the driver the fuel efficiency in miles per gallon for the most recent 0.1 gallon consumed as well as for the most recent hundred or so gallons consumed.

12 Claims, 2 Drawing Figures

3,908,451

APPARATUS FOR MEASURING ENGINE FUEL EFFICIENCY

BACKGROUND OF THE INVENTION

This invention relates generally to calculator and display equipment and more particularly to an apparatus suitable for use in a motor driven vehicle for calculating and displaying the fuel efficiency or rate of fuel comsumption thereof.

Various devices are disclosed in the prior art intended for use on motor driven vehicles to calculate and indicate fuel efficiency or the rate of fuel consumption. For example only, see U.S. Pat. Nos. 3,537,302 and 3,549,868. Although these devices do indeed have some utility, they generally are not capable of providing sufficient data in convenient form to the vehicle operator to enable the operator to optimize engine performance. More particularly, in order to conserve fuel and minimize engine emissions, it is important to maintain an engine properly tuned. A significant warning sign that an engine is in need of tuning is a reduction in fuel efficiency. In order to facilitate a vehicle operator's recognition of this occurrence, it is an object of the present invention to provide an apparatus which indicates both the historical (long term) fuel efficiency of the vehicle as well as the current (short term) fuel efficiency. If, at any time, the current fuel efficiency differs markedly from the historical fuel efficiency for reasons not explainable by differences in driving conditions, for example, it will suggest to the operator that the engine should be tuned.

SUMMARY OF THE INVENTION

The present invention is directed to an improved apparatus, suitable for use with a fuel burning engine, capable of calculating and displaying both current (short term) and historical (long term) fuel efficiency or rates of fuel consumption so as to provide an operator with data enabling him to properly recognize any degradation in engine performance.

More particularly, the present invention is directed to a digital apparatus for developing the ratio between first and second continually varying quantities. The apparatus includes means for developing a sample of one quantity accumulated within an interval defined by a unit measure of the second quantity. For example, a sample of the distance traversed (e.g., miles) by a motor driven vehicle is accumulated during an interval whose duration is defined by the consumption of a unit measure (e.g., 0.01 gallon) of fuel. The apparatus further includes arithmetic means for developing the long term average of these samples over a relatively large number of unit intervals and for frequently updating the arithmetic means output, preferably at the end of each unit interval.

In a preferred embodiment of the invention, used to indicate fuel efficiency in miles per gallon, the miles traversed by the vehicle during the most recently consumed unit of fuel are displayed on a first display device. The distances traversed during each of a plurality of previously consumed gallons are accumulated in an arithmetic means and displayed by a second display device representing the long term average fuel efficiency.

In addition, the preferred embodiment of the invention includes two additional display devices for respectively displaying the amount of fuel remaining in the vehicle tank and for displaying the mileage of a particular trip. The means for indicating the amount of fuel remaining includes a manually actuatable means which is preset to the capacity of the fuel tank upon filling and which is thereafter decremented as fuel is consumed. The means for indicating the trip mileage is reset to zero at the initiation of a trip and then incremented as the distance traversed is measured.

DESCRIPTION OF THE PREFERRED EMBODIMENT

The embodiment of the invention disclosed herein is intended for utilization in a motor driven vehicle for displaying the fuel efficiency thereof. The term "fuel efficiency" as used herein is intended to connote a measure of engine output, e.g., distance traversed, as a function of fuel consumed. Unless otherwise stated herein, it will be assumed that fuel efficiency is expressed in miles per gallon although any other measurement is possible (e.g., KM/Liter). Although the disclosed embodiment of the invention is arranged to indicate fuel efficiency, it should be recognized that an embodiment of the invention, could easily be configured to indicate "rate of fuel consumption" which term is intended to connote a measure of fuel consumed as a function of work output, e.g., gallons per mile.

Although the invention is disclosed specifically in connection with apparatus for measuring fuel efficiency or rate of fuel consumption, it will be recognized hereinafter that other embodiments of the invention are useful for determining and displaying the ratios of any two varying quantities. For example only, the two quantities could respectively be distance and time to thus indicate average miles per hour, temperature and time to indicate furnace efficiency, or electrical power consumed and mechanical motion to indicate machine efficiency.

Figure 1:
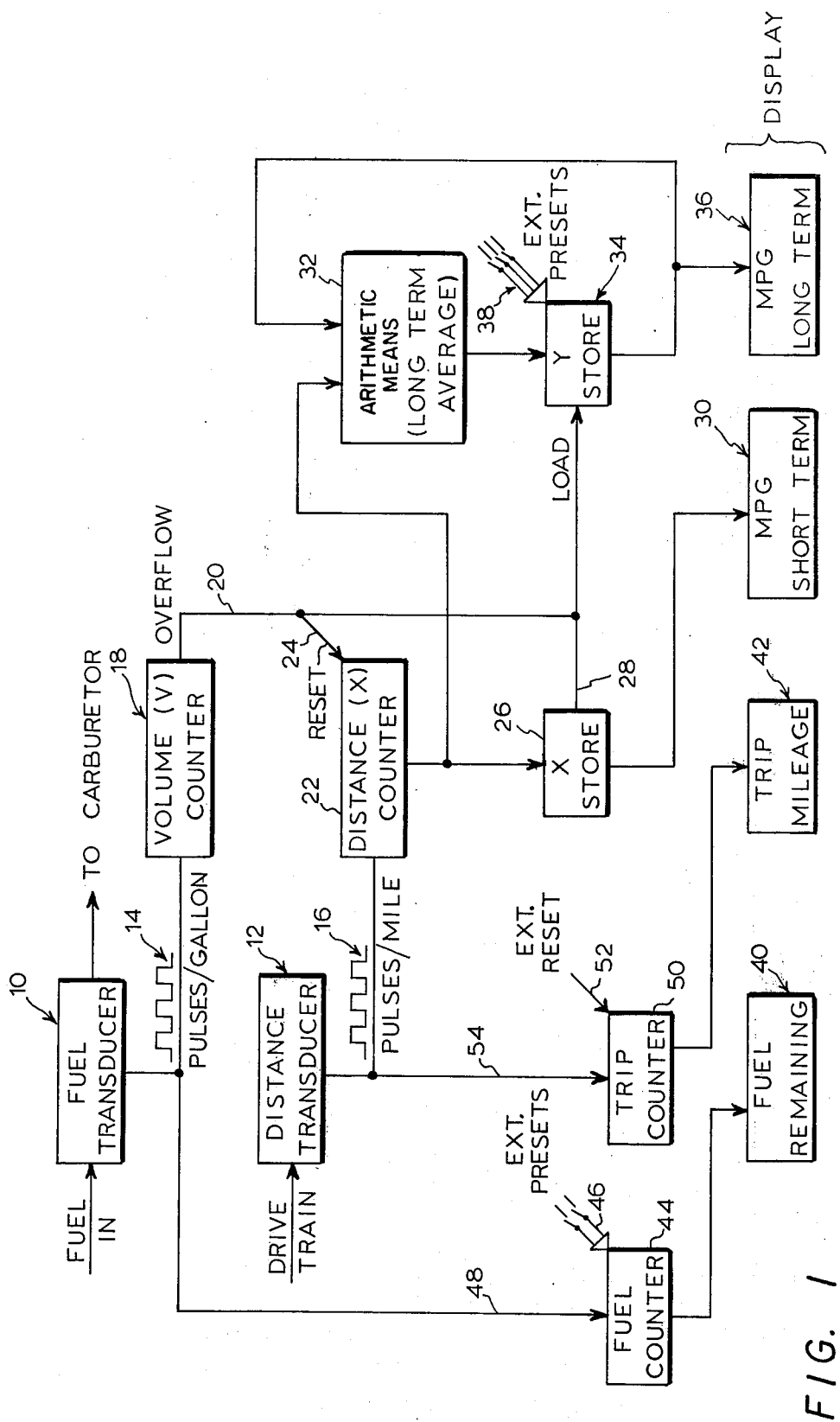
FIG. 1 is a block diagram of a preferred embodiment of the invention for use in a motor driven vehicle.

Attention is now called to FIG. 1 and initially to a fuel transducer (flow meter) 10 and a distance transducer 12. The fuel transducer constitutes a commercially available device inserted, for example, in the fuel line of a vehicle just upstream from the carburetor. The fuel transducer 10 operates to provide a train of electrical pulses 14 comprised of a number proportional to the volume of fuel measured. For exemplary purposes herein, it will be assumed that the fuel transducer 10 of FIG. 1 provides one hundred pulses 14 per gallon of fuel flowing to the carburetor.

The distance transducer 12 also provides a train of electrical pulses 16, the number of pulses being proportional to the distance traversed by the vehicle. Thus, the distance transducer 12 is coupled in some manner to the vehicle drive train or odometer. For exemplary purposes herein, it will be assumed that the transducer 12 provides one hundred pulses 16 per mile traversed by the vehicle.

The trail of pulses 14 generated by the fuel transducer 10 is applied to the input of a digital counter, hereinafter referred to as the volume, or V counter 18. The V counter 18 will be assumed to be a divide by 10 counter which provides one overflow or output pulse on line 20 for each ten electrical pulses 14 applied to the input thereof. That is, the V counter 18 cyclically counts from zero to nine, for example, and provides an output pulse on line 20 at every count line. The next succeeding electrical pulse 14 occurring after count nine returns the V counter to a zero count.

The electrical pulses 16 provided by the distance transducer 12 are applied to the input of a distance or X counter 22. The distance counter 22, for purposes herein, has a sufficiently large capacity such that it does not recycle, but rather is periodically reset by a pulse supplied to its reset input terminal 24. The overflow line 20 of the volume counter 18 is connected to the reset input terminal 24 of the distance counter 22 so as to reset the distance counter 22 for each 0.1 gallon of fuel consumed, as measured by the fuel transducer 10.

The output of the distance counter 22 is connected to the input of an X storage register 26. The X storage register 26 includes an enable or load input terminal 28 which is connected to the overflow line 20 of the volume counter 18. Thus, in response to each output pulse generated by the volume counter 18 and applied to the overflow line 20, the contents of the distance counter 22 will be transferred into the X storage register 26 and the distance counter 22 will be reset to zero. Thus, the distance traversed by the vehicle during each unit time interval, corresponding to the duration between generation of successive output pulses by the volume counter 18, will be entered into the X storage register 26 at the end of each unit interval. For example, if the vehicle is achieving 12.6 miles per gallon, then the distance counter 22 will have counted 126 pulses during the time the volume counter 18 counted 10 pulses representative of 0.1 gallon of fuel. The count of 126 will be transferred into the X storage register 26 at the termination of the unit interval as defined by the output pulse applied to the overflow line 20. The contents of the X storage register 26 are displayed to the vehicle operator via display device 30, either continually or on a time shared basis. It should be recognized that the count displayed by the display device 30 constitutes a short term average in that it represents the fuel efficiency of the vehicle only for the immediately preceding unit of fuel consumed.

Figure 2:
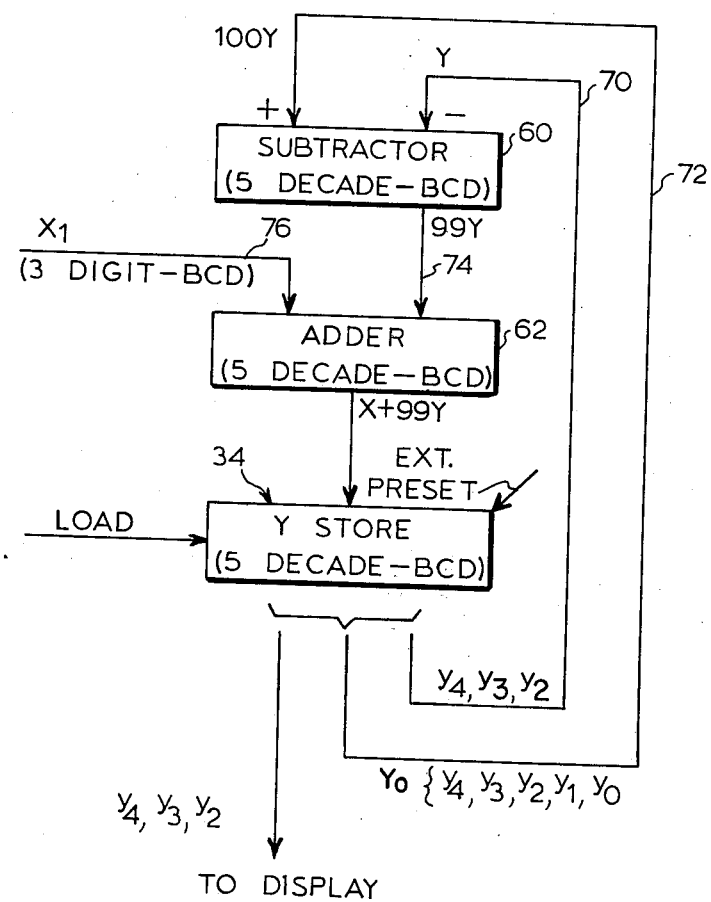
FIG. 2 is a block diagram of a preferred implementation of the arithmetic means shown in FIG. 1.

In accordance with an important aspect of the present invention, the long term fuel efficiency is also calculated and displayed. More particularly, an arithmetic 32, to be more specifically discussed hereinafter in connection with FIG. 2, is provided to arithmetic the counts developed by the distance counter 22 over a great number of unit intervals. The long term average developed by the integrator 32 is computed, for example, in accordance with the following formula:

$$Y_1 = 0.99Y_0 + 0.01X_1$$

where
$Y_1$ is the new long term average
$Y_0$ is the prior long term average
$X_1$ is the new short term average The calculation of the foregoing furmula will be explained in greater detail in connection with FIG. 2. Suffice it to say at this time that the arithmetic means 32 preferably permorms the foregoing calculation at the end of each unit interval in response to the output pulse developed by the volume counter 18 on overflow line 20. Also occurring at the end of each unit interval is the transfer of the new long term average from the arithmetic means 32 into a Y storage means 34. A display device 36, responsive to the contents of the Y storage means 34 is provided to display the long term average to the vehicle operator.

Little has been said thus far about the manner of actually implementing the various blocks referred to in FIG. 1. However, it will be recognized by those skilled in the art that digital devices are readily commercially available for functioning as the volume counter 18, the distance counter 22, the X storage register 26, and the Y storage register 34. These devices can be implemented using state of the art semiconductor technology. Semiconductor memories are generally considered to be volatile memories in that they are unable to retain information upon loss of power. Thus, when utilizing the apparatus of FIG. 1 in a vehicle, the contents of the Y storage register 34 will be lost when the vehicle battery is disconnected unless some means of auxiliary power is provided. For this purpose, it is desirable to provide a relay actuated circuit (not shown) which automatically connects a standby power source, such as a small transistor radio battery, to the Y storage register to maintain its contents when the vehicle battery is for any reason disconnected. Since the long term average developed in the Y storage meanss 34 is accumulated over a great many unit intervals, it is desirable to provide a means for more quickly developing a long term average in the Y storage register 34 after such loss of power. One manner of doing this, in accordance with the present invention is to provide an external or manually actuatable preset means enabling the operator to load a selected average into the register 34. For example only, in a simple embodiment of the invention, the operator is able to actuate any one of three selected switches 38 which respectively enter long term averages of 10, 20, and 30 into the register 34. The operator will select the particular long term average which he deems most closely approximates the actual long term average of the vehicle. Subsequent running of the vehicle will then modify the inserted long term average as will be described more specifically hereinafter.

Prior to discussing a specific embodiment of the arithmetic means 32, as shown in FIG. 2, it is pointed out that two additional display devices 40 and 42 are provided for displaying information to the vehicle operator. The display device 40 displays a number representing the amount of fuel remaining in the vehicle tank. This number is developed by the fuel counter 44 which is manually preset by the vehicle operator via a preset input terminals 46 at the time the vehicle's fuel tank is filled. After filling, the electrical pulses 14 developed by the fuel transducer 10 decrement the count in the fuel counter 44 via input terminal 48.

The display 42 is used to display to the operator the distance traversed on a particular trip. The display 42 is responsive to a trip counter 50 which can be manually reset to zero by the vehicle operator via reset input terminal 52. The pulses 16 provided by the distance transducer 12 increment the trip counter via input terminal 54.

The display devices 30, 36, 40, and 42 are preferably implemented utilizing commercially available digital display devices. However, it should be recognized that they could also be implemented utilizing conventional electro-mechanical displays. In any event, it is pointed out that although the input display devices are shown as constituting separate devices for concurrently displaying the four distinct items of data, a single display device could be utilized instead on a time shared basis.

Attention is now called to FIG. 2 which illustrates the arithmetic means 32 and Y storage register 34 of FIG. 1. Prior to considering the specific implementation illustrated, it should be recalled that the long term average is computed by the formula:

$Y_1 = 0.99Y_0 + 0.01X_1$ which is equivalent to:

$$Y_1 = \frac{99Y_0 + X_1}{100}$$

where $Y_1$ is the new long term average
$Y_0$ is the prior long term average
$X_1$ is the new short term average The implementation for computing the long term average in accordance with the formula will be assumed herein to operate using binary coded decimal (BCD) arithmetic and includes a five decade (BCD) subtractor 60 and a five decade (BCD) adder 62. The previously mentioned Y storage register 34 comprises a five decade storage register, the decades of which from least significant to most significant are represented respectively as $Y_0$, $Y_1$, $Y_2$, $Y_3$, $Y_4$. The three most significant digits displayed in the Y register decades $Y_2$, $Y_3$, and $Y_4$ are applied to the previously mentioned display device 36. In order to calculate the previously mentioned formula to develop a new long term average, one percent of the contents of the Y storage register, i.e., the current long term average $Y_0$, is subtracted from the value in the Y storage register. This is accomplished by applying the contents of decades $y_2$, $y_3$, $y_4$ of the register 34 to the three least significant decades of the substracter 60 as the substrahend and applying the entire contents of the register 34 to the subtracter 60 as the minuend. The subtracter 60 will thereby produce on its output terminal the value $99Y_o$. The value $99Y_o$ is applied to adder input terminal 74 together with the value $X_1$ applied to adder input terminal 76 by the distance counter 22 previously discussed in connection with FIG. 1. As a consequence, the adder 62 will provide an output to the Y storage register 34 representative of X + 99Y which is then stored in the register 34. X 99Y/100 is read out to the display device 36 by ignoring the least two significant decades of the Y storage register 34. The transfer of a new long term average into Y storage means 34 from the adder 62 is accomplished in response to the generation of each output pulse by the volume counter 18 on the overflow line 20.

To see how the formula actually works, assume the vehicle has a long term average of 20.0 mpg. Now for some reason the vehicle starts getting short term averages of 16.7 mpg. The successive long term averages and read-out for a new iterations are shown below in Table 1.

TABLE 1

| (X) Short Term Average | (Y) Long Term Average | Read-Out |
|---|---|---|
| 16.7 | 20.000 | 20.0 |
| 16.7 | 19.967 | 19.9 |
| 16.7 | 19.935 | 19.9 |
| 16.7 | 19.903 | 19.9 |
| 16.7 | 19.871 | 19.8 |
| 16.7 | 19.840 | 19.8 |
| 16.7 | 19.809 | 19.8 |
| 16.7 | 19.778 | 19.7 |

TABLE 1-Continued

| 16.7 | 19.748 | 19.7 |
|---|---|---|
| 16.7 | 19.718 | 19.7 |
| 16.7 | 19.688 | 19.6 |
| 16.7 | 19.659 | 19.6 |
| 16.7 | 19.630 | 19.6 |
| 16.7 | 19.601 | 19.6 |
| 16.7 | 19.572 | 19.5 |

From table 1, it can be seen that the effect of X (short term average) on Y (long term average) is very slight. In fact depending upon the difference between X and Y, it may take several hundred iterations before Y had assumed the value of X. This is assuming that X has not changed for the entire period. In the above example with the average changing from 20.0 mpg to 16.7 mpg, it will take about 400 iterations before the read-out indicates 16.7. At the rate of 16.7 mpg this will take about 670 miles. Table 2 shows how the rate of convergence varies with the difference between X and Y.

Table 2

| 20.0 to 19.0 | (approximately) | 35 iterations |
|---|---|---|
| 19.0 to 18.0 | " | 55 iterations |
| 18.0 to 17.0 | " | 125 iterations |
| 17.0 to 16.7 | " | 185 iterations |
| | | 400 |

From the foregoing, it will be recognized that an apparatus has been disclosed herein for measuring and indicating both the short term and long term fuel efficiency of a fuel consuming engine. It will be recognized by those skilled in the art that the apparatus can be readily implemented utilizing various types of commercially available digital devices. Although the preferred implementation of the arithmetic means has been explained in terms of BCD arithmetic, it should also be readily appreciated that other types of arithmetic such as straight binary could be employed.

What is claimed is:

1. Apparatus for measuring and indicating the fuel efficiency of a fuel consuming engine comprising:
    first means for generating an electrical output pulse in response to each unit measure of fuel consumed;
    transducer means for producing a number of electrical pulses proportional to a measurable quantity produced by said engine;
    counting means for counting the number of pulses produced by said transducer means during each unit interval between successive output pulses generated by said first means;
    arithmetic means for producing a signal representative of the long term average of the counts produced by said counting means over a plurality of preceding unit intervals; and
    indicator means for displaying a value proportional to said signal produced by said arithmetic means.

2. The apparatus of claim 1 further including:
    second indicator means for displaying the count accumulated by said counting means during the immediately preceding unit interval.

3. The apparatus of claim 1 wherein said first means includes:
    fuel transducer means for producing a number of electrical pulses proportional to the amount of fuel consumed; and
    fuel counting means for counting the pulses produced by said fuel transducer means and for generating one output pulse for each successive group of a predetermined number of pulses produced by said fuel transducer means.

4. The apparatus of claim 3 wherein said first named transducer means includes means for producing said electrical pulses in proportion to the distance travelled by said engine.

5. The apparatus of claim 4 further including:
distance storage means including manually actuable means for storing a predetermined count therein; and
means for incrementing the count in said distance storage means in response to the number of pulses produced by said first named transducer means.

6. The apparatus of claim 4 including:
fuel storage means for storing a count respresentative of unconsumed fuel and including manually actuable means for storing a predetermined count therein; and
means for decrementing the count of said fuel storage means in response to the number of pulses produced by said fuel transducer means.

7. The apparatus of claim 1 wherein said arithmetic means includes:
storage means for storing the sum of counts successively developed by said counting means;
subtractor means for subtracting a predetermined portion of said sum from said sum to produce a difference; and
adder means for adding the count counted by said counting means to said difference and for storing a sum in said storage means.

8. The apparatus of claim 7 including:
manually actuatable means for storing a selected sum in said storage means.

9. Calculating apparatus comprising:
first means for generating successive electrical output pulses;
transducer means for producing a train of electrical pulses;
counting means for counting the number of pulses produced by said transducer means during each unit interval between succesive output pulses generated by said first means;
arithmetic means for producing a signal representative of the long term average of the counts produced by said counting means over a plurality of preceding unit intervals; and
indicator means for displaying a value proportional to said signal produced by said arithmetic means.

10. A fuel efficiency calculator for use in a motor driven vehicle for indicating the miles traversed as a function of the gallons of fuel consumed, said calculator comprising:
flow meter means for generating a number of electrical pulses proportional to the volume of fuel consumed;
volume counter means for counting said pulses generated by said flow meter means and for providing one output pulse for each predetermined number of pulses generated by said flow meter means;
transducer means for generating a number of electrical pulses proportional to the distance traversed by said vehicle;
distance counter means for counting the number of pulses generated by said transducer means during a unit interval between the provision of successive output pulses by said volume counter means;
arithmetic means for producing a signal representative of the long term average of the counts produced by said counting means over a plurality of successive unit intervals; and
indicator means for displaying a count proportional to said signal produced by said arithmetic means.

11. The calculator of claim 10 including:
storage means for storing the sum of counts successively developed by said distance counter means;
subtractor means for subtracting a predetermined portion of said sum from said sum to produce a difference; and
adder means for adding the count counted by said distance counter means to said difference and for storing a sum in said storage means.

12. The calculator of claim 11 including:
manually actuatable means for storing a selected sum in said storage means.

* * * * *